(12) United States Patent
Wang et al.

(10) Patent No.: US 11,856,152 B2
(45) Date of Patent: Dec. 26, 2023

(54) VIDEO SPECIAL EFFECT CONFIGURATION FILE GENERATION METHOD AND APPARATUS, AND VIDEO RENDERING METHOD AND APPARATUS

(71) Applicant: BEIJING BYTEDANCE NETWORK TECHNOLOGY CO., LTD., Beijing (CN)

(72) Inventors: Yujia Wang, Beijing (CN); Feng Qiu, Beijing (CN); Bao Zhang, Beijing (CN); Le Gao, Beijing (CN); Haozhe Li, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/886,205

(22) Filed: Aug. 11, 2022

(65) Prior Publication Data

US 2022/0385836 A1 Dec. 1, 2022

Related U.S. Application Data

(63) Continuation of application No. PCT/CN2021/080323, filed on Mar. 11, 2021.

(30) Foreign Application Priority Data

Apr. 2, 2020 (CN) .......................... 202010256356.7

(51) Int. Cl.
*H04N 5/262* (2006.01)
*H04N 23/63* (2023.01)

(52) U.S. Cl.
CPC ......... *H04N 5/2624* (2013.01); *H04N 5/2621* (2013.01); *H04N 23/632* (2023.01)

(58) Field of Classification Search
CPC ... H04N 5/2621; H04N 23/632; H04N 5/2624
See application file for complete search history.

(56) References Cited

U.S. PATENT DOCUMENTS

2007/0081740 A1 4/2007 Ciudad et al.
2008/0278628 A1 11/2008 Hirata et al.
(Continued)

FOREIGN PATENT DOCUMENTS

CN 102547069 A 7/2012
CN 103177183 A 6/2013
(Continued)

OTHER PUBLICATIONS

International Patent Application No. PCT/CN2021/080323; Int'l Search Report; dated Jun. 1, 2021; 2 pages.
(Continued)

*Primary Examiner* — Michael Roswell
(74) *Attorney, Agent, or Firm* — BakerHostetler

(57) ABSTRACT

Provided are a video special effect configuration file generation method and apparatus, and a video rendering method and apparatus. The video special effect configuration file generation method includes: obtaining a reference image; receiving a screen splitting processing operation of a user on the reference image; performing screen splitting processing on the reference image based on the screen splitting processing operation to obtain a plurality of sub-screens; and associating, in response to a special effect setting operation of the user on a target sub-screen among the plurality of sub-screens, at least one first special effect corresponding to the special effect setting operation with the target sub-screen, to generate a video special effect configuration file. The user can customize the screen splitting processing manner and the rendering special effect of the sub-screen, the video special effect configuration file generation method is more flexible and is more convenient for use.

18 Claims, 4 Drawing Sheets

(56) References Cited

U.S. PATENT DOCUMENTS

| | | | | |
|---|---|---|---|---|
| 2014/0205207 | A1* | 7/2014 | Bhatt | G06T 11/60 382/311 |
| 2015/0172534 | A1* | 6/2015 | Miyakawa | H04N 23/80 348/222.1 |
| 2016/0366344 | A1* | 12/2016 | Pan | H04N 23/62 |
| 2018/0075524 | A1 | 3/2018 | Sartori et al. | |
| 2019/0238759 | A1* | 8/2019 | Ahn | G06T 5/00 |
| 2020/0177823 | A1* | 6/2020 | Zhu | H04N 7/141 |
| 2020/0329272 | A1 | 10/2020 | Xu et al. | |
| 2021/0248725 | A1* | 8/2021 | Kang | G06T 5/20 |

FOREIGN PATENT DOCUMENTS

| | | | |
|---|---|---|---|
| CN | 104322050 | A | 1/2015 |
| CN | 104486558 | A | 4/2015 |
| CN | 104574491 | A | 4/2015 |
| CN | 106331482 | A | 1/2017 |
| CN | 107770450 | A | 3/2018 |
| CN | 109144384 | A | 1/2019 |
| CN | 110070496 | A | 7/2019 |
| CN | 110070592 | A | 7/2019 |
| CN | 110287368 | A | 9/2019 |
| CN | 110769152 | A | 2/2020 |
| CN | 110769313 | A | 2/2020 |
| CN | 111221444 | A | 6/2020 |
| CN | 111258519 | A | 6/2020 |
| JP | 2021-508883 | A | 3/2021 |
| WO | WO 2013/175784 | A1 | 11/2013 |
| WO | WO 2017/096899 | A1 | 6/2017 |

OTHER PUBLICATIONS

"How to elegantly implement a split screen filter"; https://cloud.tencent.com/developer/article/1540089; Tencent Cloud; Nov. 2019; accessed Mar. 19, 2023; 15 pages (contains English Translation).

European Patent Application No. 21782120.6; Extended Search Report; dated Jul. 13, 2023; 44 pages.

\* cited by examiner

VIDEO SPECIAL EFFECT CONFIGURATION FILE GENERATION METHOD AND APPARATUS, AND VIDEO RENDERING METHOD AND APPARATUS

CROSS-REFERENCE TO RELATED APPLICATIONS

This application is a continuation of International Application No. PCT/CN2021/080323, filed on Mar. 11, 2021, which claims priority to Chinese Application No. 202010256356.7 filed with China National Intellectual Property Administration on Apr. 2, 2020, which are incorporated herein by reference in their entireties for all purposes.

FIELD

The present disclosure relates to the field of information processing technologies, and more particular, the present disclosure relates to a video special effect configuration file generation method and apparatus, and a video rendering method and apparatus.

BACKGROUND

With the rapid development of computer technology and mobile communication technology, various application programs (APPs) based on mobile terminals have been widely used, which improves the convenience and richness of daily life. Applications of various social platforms are generally welcomed, and users can publish articles, videos and audios, etc. through social platforms, and share them with others.

When a user shoots a video with an application, he/she expects a richer video display effect, for example, displaying a plurality of split-screen special effects on the same screen. At present, the rendering effects of different screen splitting special effects need to be fixedly written by codes respectively, and cannot be configured by designers dynamically, which lacks of ease of use and lacks of flexibility.

SUMMARY

The present disclosure provides a video special effect configuration file generation method and apparatus, and a video rendering method and apparatus, which are used to at least solve the problems existing in the related art.

In a first aspect, a video special effect configuration file generation method is provided. The method includes: obtaining a reference image; receiving a screen splitting processing operation of a user on the reference image; performing screen splitting processing on the reference image based on the screen splitting processing operation to obtain a plurality of sub-screens; and associating, in response to a special effect setting operation of the user on a target sub-screen among the plurality of sub-screens, at least one first special effect corresponding to the special effect setting operation with the target sub-screen, to generate a video special effect configuration file.

In a second aspect, a video rendering method is provided. The method includes: displaying a list of video special effect configuration files in response to receiving a video shooting trigger operation of a user; receiving a selection operation of the user on a video special effect configuration file in the list of video special effect configuration files, wherein the video special effect configuration file in the list of video special effect configuration files is generated by the video special effect configuration file generation method according the embodiment of the present disclosure; and processing, in response to receiving a video shooting operation of the user, a shot video by using a special effect and a screen splitting processing manner corresponding to the video special effect configuration file corresponding to the special effect selection operation.

In a third aspect, a video special effect configuration file generation apparatus is provided. The apparatus includes: an obtaining module configured to obtain a reference image; a receiving module configured to receive a screen splitting processing operation of a user on the reference image; a screen splitting module configured to perform screen splitting processing on the reference image based on the screen splitting processing operation to obtain a plurality of sub-screens; and a generating module configured to associate, in response to a special effect setting operation of the user on a target sub-screen among the plurality of sub-screens, at least one first special effect corresponding to the special effect setting operation with the target sub-screen, to generate a video special effect configuration file.

In a fourth aspect, a video rendering apparatus is provided. The apparatus includes: a display module configured to display a list of video special effect configuration files in response to receiving a video shooting trigger operation of a user; a receiving module configured to receive a selection operation of the user on a video special effect configuration file in the list of video special effect configuration files, wherein the video special effect configuration file in the list of video special effect configuration files is generated by the video special effect configuration file generation method according to the embodiment of the present disclosure; and a processing module configured to process, in response to receiving a video shooting operation of the user, a shot video by using a special effect and a screen splitting processing manner corresponding to the video special effect configuration file corresponding to the special effect selection operation.

In a fifth aspect, the present disclosure provides an electronic device. The electronic device includes: one or more processors; a memory; and one or more application programs stored in the memory and configured to be executed by one or more processors. The one or more application programs are configured to perform the operations corresponding to the video special effect configuration file generation method as shown in the first aspect of the present disclosure or the operations corresponding to the video rendering method as shown in the second aspect of the present disclosure.

In a sixth aspect, the present disclosure provides a computer-readable medium having computer instructions stored thereon. The computer instructions, when running on a computer, cause the computer to implement the video special effect configuration file generation method as shown in the first aspect of the present disclosure or the video rendering method as shown in the second aspect of the present disclosure.

The present disclosure can at least achieve the following beneficial effects.

According to the video special effect configuration file generation method and apparatus, and the video rendering method and apparatus provided in the embodiments of the present disclosure, a reference image is obtained; a screen splitting processing operation of a user on the reference image is received; screen splitting processing is performed on the reference image based on the screen splitting processing operation to obtain a plurality of sub-screens; and in response to a special effect setting operation of the user on a target sub-screen among the plurality of sub-screens, at least one first special effect corresponding to the special effect setting operation is associated with the target sub-screen, to generate a video special effect configuration file. In the present disclosure, the user can customize the screen splitting processing and the rendering special effect of the sub-screen, so that the video special effect configuration is flexible and the use is more convenient.

BRIEF DESCRIPTION OF DRAWINGS

In order to clearly explain technical solutions of embodiments of the present disclosure, drawings used in the embodiments are briefly described below.

DESCRIPTION OF EMBODIMENTS

Figure 1:
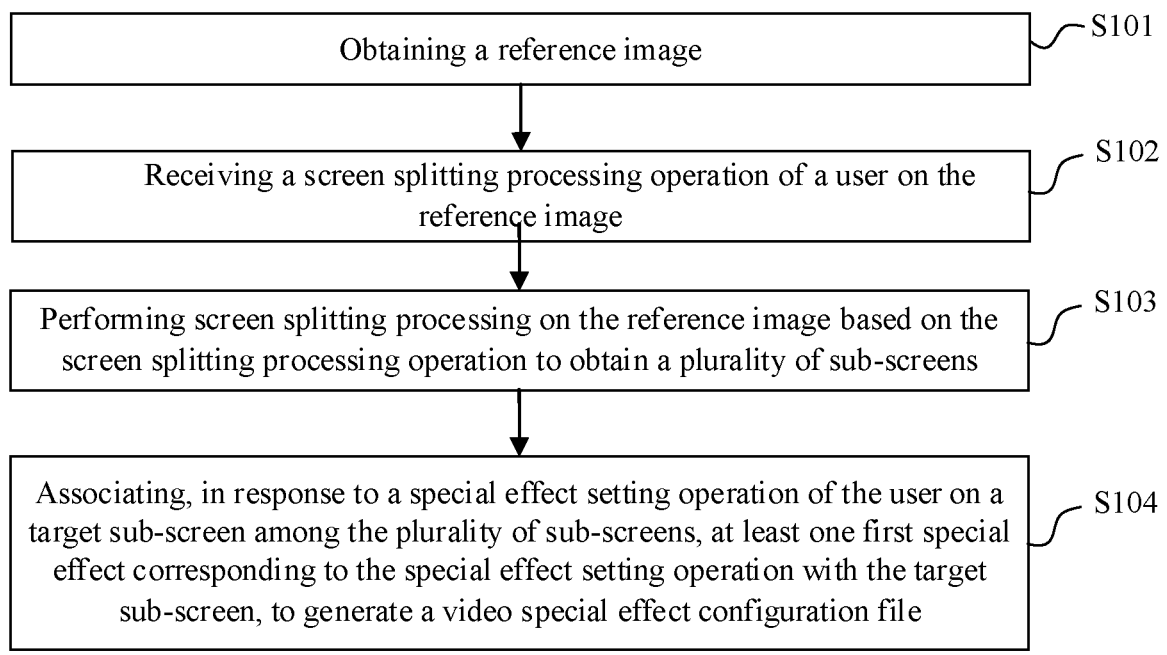
FIG. 1 is a schematic flowchart of a video special effect configuration file generation method according to an embodiment of the present disclosure.

Embodiments of the present disclosure will be described in further detail below with reference to the accompanying drawings. While some embodiments of the present disclosure are shown in the figures, it should be understood that the present disclosure may be embodied in various forms and should not be construed as being limited to the embodiments set forth herein. Rather, these embodiments are provided for the purpose of more thorough and complete understanding of the present disclosure. It should be understood that the figures and embodiments of the present disclosure are only for the purpose of illustration, and are not intended to limit the scope of the present disclosure.

It should be understood that various blocks described in the method embodiments of the present disclosure may be performed in different orders and/or in parallel. Furthermore, method embodiments may include one or more additional blocks and/or may omit one or more illustrated blocks. The scope of the present disclosure is not limited in this regard.

As used herein, the term "including" and variations thereof are open-ended inclusions, i.e., "including but not limited to". The term "based on" means "based at least in part on." The term "an embodiment" means "at least one embodiment". The term "another embodiment" means "at least one further embodiment". The term "some embodiments" means "at least some embodiments". Relevant definitions of other terms will be given in the description below.

It should be noted that concepts such as "first" and "second" as used in the present disclosure are only used to distinguish different devices, modules or units from each other, and are not intended to limit these devices, modules or units to be necessarily different devices, modules or units and are not intended to limit any order or interdependence of the functions performed by these devices, modules or units.

It should be noted that the modifications by "a" and "a plurality" as used in the present disclosure are illustrative rather than limiting, and it should be appreciated by those skilled in the art that they should be understood as "one or more", unless explicitly indicated otherwise in the context.

The names of messages or information exchanged between a plurality of devices in the embodiments of the present disclosure are only for the purpose of illustration, and are not intended to limit the scope of the messages or information.

The technical solutions of the present disclosure and how the technical solutions of the present disclosure solve the above-mentioned technical problems will be described in detail below with specific embodiments. The following specific embodiments may be combined with each other, and the same or similar concepts or processes may be omitted in some embodiments. The embodiments of the present disclosure will be described below with reference to the accompanying drawings. A video special effect configuration file generation method of the present disclosure may specifically be a visualized video special effect configuration file generation tool. Based on the method, a designer of a video special effect configuration file can generate a video special effect configuration file by the video special effect configuration file generation tool, to be used by an ordinary user who shoots a video and has a special effect rendering need.

In the technical solution of the present disclosure, a reference image is a configuration file image, which can be a video image for reference. The designer of the video special effect configuration file can generate a video special effect configuration file based on the reference image according to the solution provided by the present disclosure. Special effect corresponding to the configuration file can be displayed for the user through the reference image. In practical applications, if the user selects a video special effect configuration file, the special effect corresponding to the configuration file can be displayed for the user through the reference image. During video shooting, the special effect can be applied to each frame of image of the video shot by the user. That is to say, the reference image is only used for the user to display a screen splitting effect and set a corresponding special effect. The technical solution of the present disclosure does not actually process the reference image, but uses the special effect configuration file corresponding to the reference image to perform screen splitting processing on the image of the video, set corresponding special effect for each sub-screen, and render the video in accordance with the special effect, so that the video displays the special effect set in the configuration file during playback.

FIG. 1 is a flowchart of a video special effect configuration file generation method according to an embodiment of the present disclosure. As shown in FIG. 1, the method may include the following blocks.

At block S101, a reference image is obtained.

An execution subject of the present disclosure may be a terminal device, such as a computer, a mobile phone, and the like.

The reference image can be an arbitrary image selected by a user (the designer of the video special effect configuration file). After the reference image is obtained, the reference image can be displayed to the user, so that the user can perform a screen splitting operation based on the displayed reference image and set a corresponding special effect.

At block S102, a screen splitting processing operation of a user on the reference image is received.

Specifically, the user can perform the screen splitting processing on the reference image, so that the video displays a screen splitting special effect. The screen splitting processing operation may include any one of a screen splitting mode selection operation, a sub-screen copy operation, or a sub-screen splitting operation.

At block S103, screen splitting processing is performed on the reference image based on the screen splitting processing operation to obtain a plurality of sub-screens.

Through the screen splitting processing operation of the user, all or part of the reference image can be displayed on the plurality of sub-screens, an area corresponding to each sub-screen in the video image is determined, and the user can set a corresponding special effect for the area corresponding to each sub-screen.

In a possible implementation, the screen splitting processing operation includes a screen splitting mode selection operation. The operation of performing the screen splitting processing on the reference image based on the screen splitting processing operation to obtain the plurality of sub-screens includes: performing the screen splitting processing on the reference image based on a screen splitting mode corresponding to the screen splitting mode selection operation on the reference image by the user, to obtain the plurality of sub-screens.

In practical applications, the user can perform the screen splitting mode selection operation from predetermined screen splitting modes. For example, the predetermined screen splitting modes can include three-split screen, four-split screen, nine-split screen, etc. According to the screen splitting mode selected by the user, the plurality of sub-screens is obtained by division, and the reference image is displayed on the plurality of sub-screens. For example, if the user selects the three-split screen mode, three sub-screens are obtained; and if the user selects the four-split screen mode, four sub-screens are obtained. Each sub-screen can display the reference image. Of course, various screen splitting modes can be classified into horizontal screen splitting and vertical screen splitting, etc. Specifically, a list of screen splitting modes can be displayed to the user for selection, or the number of rows and the number of columns input by the user can be used to directly generate the screen splitting mode with the corresponding rows and columns. In the embodiment of the present disclosure, for the plurality of sub-screens obtained based on the screen splitting mode selection operation, a size and a position of each sub-screen are predetermined, and the user does not need to set manually. In this way, the display effects after the screen splitting can be directly obtained, which is convenient to operate and convenient for the user for quick screen splitting.

In a possible implementation, the screen splitting processing operation includes a sub-screen copy operation. The operation of performing the screen splitting processing on the reference image based on the screen splitting processing operation to obtain the plurality of sub-screens includes: copying the reference image based on the sub-screen copy operation on the reference image by the user to obtain the plurality of sub-screens, each of the plurality of sub-screens displaying the reference image.

In practical applications, the sub-screen copy operation may specifically include copying a sub-screen corresponding to the reference image in the screen. The user can use a sub-screen copy button to realize the sub-screen copy operation to copy the sub-screen corresponding to the reference image, so that the terminal screen displays the plurality of sub-screens and each sub-screen displays the reference image. In the embodiment of the present disclosure, the user can quickly copy a corresponding number of sub-screens through the sub-screen copy operation, so that the screen splitting operation is more flexible.

In a possible implementation, the screen splitting processing operation includes a sub-screen splitting operation. The operation of performing the screen splitting processing on the reference image based on the screen splitting processing operation to obtain the plurality of sub-screens includes: splitting the reference image based on the sub-screen splitting operation of the user on the reference image, to obtain the plurality of sub-screens, each of the plurality of sub-screens displaying a part of the reference image.

In practical applications, the sub-screen splitting operation may specifically include displaying different parts of the reference image in different sub-screens by means of splitting. The reference image may be split for multiple times, or the split part of the reference image may be split again, so that a screen splitting display effect of displaying the reference image in the plurality of sub-screens is achieved. In the embodiment of the present disclosure, by sub-screen splitting to achieve the screen splitting, different parts of the reference image can be displayed in different sub-screens, which enriches the display effect.

At block S104, in response to a special effect setting operation of the user on a target sub-screen among the plurality of sub-screens, at least one first special effect corresponding to the special effect setting operation are associated with the target sub-screen to generate a video special effect configuration file.

After obtaining the respective sub-screens by means of the screen splitting processing, the user can select one of the sub-screens as the target sub-screen, and set the special effect corresponding to the sub-screen. Then, the special effect corresponding to the special effect setting operation is associated with the corresponding target sub-screen. After the special effect is set for each sub-screen, each sub-screen and the special effect corresponding to the sub-screen is stored, to generate the video special effect configuration file.

When at least one first special effect corresponding to the special effect setting operation is associated with the corresponding target sub-screen, identifier information corresponding to the target sub-screen may be obtained first, and the first special effect are associated with the identifier information corresponding to the target sub-screen. The identifier information is unique identifier information that distinguishes the sub-screen from other sub-screens, and may specifically include position information of the sub-screen in the screen, etc. Alternatively, the identifier information can be in other forms, which are not limited in the present disclosure.

The purpose of associating the first special effect corresponding to the special effect setting operation with the identifier information corresponding to the target sub-screen is that, when the sub-screen needs to be rendered, a special effect rendering parameter of the associated first special effect can be queried based on the identifier information of the sub-screen, and special effect rendering can be performed on the sub-scree with the special effect rendering parameter.

It should be noted that the user can set different special effect for respective sub-screens, or can set special effects for some sub-screens and set no special effect for other sub-screens. For the sub-screens with no special effect can directly display the video image during rendering.

The special effect setting operation may include adding a special effect element to the target sub-screen. The special effect setting operation may further include setting a size of the target sub-screen, a position of the target sub-screen, etc. Details are illustrated in the following embodiments.

In a possible implementation, the special effect setting operation includes adding a special effect element to the target sub-screen.

The special effect element may include: a text, a dynamic or static image, a beauty makeup, a filter, etc. Special effect data corresponding to the special effect element can be obtained from a local special effect database or a cloud end special effect database. A text, a sticker, and the like can be added on the target sub-screen. The sticker can include a small-size image that is attached on the image. Different styles of beauty makeup special effect can be added to a character in the image, such as a light makeup, a heavy makeup, etc. Different styles of filters can be set, such as natural, fair, nostalgic, black and white, retro, etc.

In addition to the special effect addition, the special effect setting operation for the target sub-screen may further include a size setting.

In a possible implementation, the special effect setting operation is implemented by: receiving a size setting operation of the user on the target sub-screen; determining a size of the target sub-screen based on a size parameter corresponding to the size setting operation.

In practical applications, the size of the target sub-screen can be set in various ways. In accordance with the size setting operation of the user, a size input dialog box can be triggered to be displayed and to receive the size parameter inputted by the user. Alternatively, a size input area can be directly displayed to receive the size parameter inputted by the user. Or, the target sub-screen can be selected and dragged to adjust the size of the target sub-screen to determine the size of the target sub-screen. The size of the target sub-screen can be enlarged or reduced to adjust the size of the target sub-screen. The size of the target sub-screen is customized in accordance with the operation of the user, so that the size setting of the target sub-screen is more flexible.

In addition to the special effect addition and the size setting, the special effect setting operation for the target sub-screen may further include a position setting.

In a possible implementation, the special effect setting operation is implemented by: receiving a position setting operation of the user on the target sub-screen, and determining, based on the position setting operation, a position parameter corresponding to the target sub-screen; and determining a display position of the target sub-screen based on the position parameter.

In practical applications, in accordance with the position setting operation of the user, a position input dialog box can be triggered to be displayed and to receive the position parameter input by the user. Alternatively, a position input area can be directly displayed to receive the position parameter inputted by the user. Or, the target sub-screen can be moved to a specified position in accordance with a dragging action of the user on the target sub-screen, to determine the position of the target sub-screen. The position of the target sub-screen is customized in accordance with the operation of the user, so that the position setting of the target sub-screen is more flexible.

In addition, in addition to the special effect set by the user for the target sub-screen, the video special effect configuration file of the present disclosure further includes at least one predetermined second special effect that is used universally by each sub-screen of the plurality of sub-screens.

In practical applications, the predetermined second special effect that are used universally by each sub-screen may include a universal special effect set on all the sub-screens obtained by the screen splitting processing. During rendering of the video, firstly, all the sub-screens are rendered with the predetermined second special effect, and then the rendering is performed in accordance with the first special effect corresponding to each sub-screen.

In addition, the video special effect configuration file may further include at least one second special effect that is predetermined for each sub-screen obtained by the screen splitting processing, different second special effect being predetermined for different sub-screens. During rendering of a video, for a sub-screen, the sub-screen is rendered with the predetermined second special effect first, and then rendered with the first special effect. For example, sub-screen 1 and sub-screen 2 are obtained based on the screen splitting operation of the user; and the predetermined second special effect for sub-screen 1 are special effect a1 and b1, and the predetermined second special effect for sub-screen 2 is special effect c1.

The second special effect may include special effect such as a built-in dermabrasion, a built-in filter, a built-in beauty makeup, etc. The second special effect may include special effect of any other form, which are not limited in the present disclosure.

In order to use the video special effect configuration file to render the video to be processed, a rendering link list needs to be established in advance, and the rendering is performed in an order of the rendering link list.

In a possible implementation, the method further includes: generating and storing a rendering link list corresponding to the video special effect configuration file. The rendering link list includes a universal rendering link list and a sub-screen rendering link list. The universal rendering link list includes a special effect node of each second special effect and an execution order of each second special effect. The sub-screen rendering link list includes a special effect node of each first special effect corresponding to the target sub-screen and an execution order of each first special effect. A first special effect node of the sub-screen rendering link list is connected to a last special effect node of the universal rendering link list.

In practical applications, the rendering link list is a branched structure, including the universal rendering link list and the sub-screen rendering link list. The main chain of the rendering link list is the universal rendering link list. The universal rendering link list includes the special effect nodes of the second special effect that are predetermined and universal to respective sub-screens and the corresponding execution order. A branch chain of the rendering link list is the sub-screen rendering link list. The sub-screen rendering link list includes a special effect node of each first special effect corresponding to the target sub-screen and the corresponding execution order. The first special effect node of the sub-screen rendering link list is connected to the last special effect node of the universal rendering link list, to form the rendering link list of the branched structure.

Figure 2:
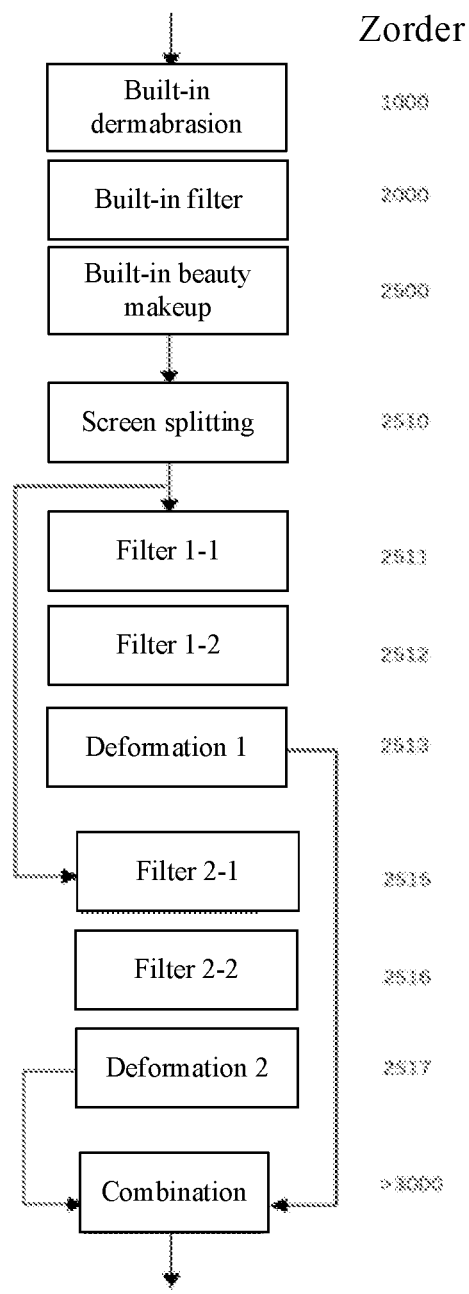
FIG. 2 is a schematic diagram of a rendering link list according to an embodiment of the present disclosure.

In an example, the structure of the rendering link list is shown in FIG. 2. It includes the universal rendering link list and the sub-screen rendering link list. The universal rendering link list includes the special effect nodes of the second special effect, including: a built-in dermabrasion, a built-in filter, and a built-in beauty makeup, and the corresponding execution order is: the built-in dermabrasion, the built-in filter, the built-in beauty makeup. Then the screen is split to obtain respective sub-screens. The special effect nodes of the first special effect corresponding to sub-screen 1 include: filter 1-1, filter 1-2, deformation 1, and the corresponding execution order is: filter 1-1, filter 1-2, deformation 1. The special effect nodes of the first special effect corresponding to sub-screen 2 include: filter 2-1, filter 2-2, deformation 2, and the corresponding execution order is: filter 2-1, filter 2-2, deformation 2. Then sub-screen 1 and sub-screen 2 are combined. The sub-screen rendering link list corresponding to sub-screen 1, the sub-screen rendering link list corresponding to sub-screen 2, and the universal rendering link list are connected through "screen splitting" nodes, to obtain the rendering link list of the branched structure. The smaller the number corresponding to the drawing order (zorder) (1000, 2000 . . . shown in the figure) is, the earlier the corresponding node is drawn, and the node with a greater number will overwrite the node with a smaller number.

The difference between the rendering link list in the present disclosure and the rendering link list in the related art is that the rendering link list in the related art is a single-chain structure, and each single chain includes the special effect node of at least one second special effect that is predetermined and universal to the respective sub-screens and the execution order of each second special effect, as well as the special effect node of the first special effect corresponding to each sub-screen and the execution order of each first special effect. That is to say, rendering of each sub-screen needs to execute the special effect node of the at least one second special effect that is predetermined and universal to respective sub-screens.

Take the rendering link list in FIG. 2 as an example, rendering of each sub-screen starts from the beginning of the rendering link list. The beginning of the rendering link list is the "built-in dermabrasion" node. The "built-in dermabrasion", "built-in filter" and "built-in beauty makeup" only need to be executed once. After that, the rendering of each sub-screen is done by copying the node "screen splitting" in the rendering link list and rendering the next sub-screen from this node without starting from the beginning.

Therefore, during the video rendering by using the rendering link list of the present disclosure, since the node can be copied from the rendering link list to change the rendering link list from the single-chain structure to a multi-branch structure, rendering of each sub-screen does not need to be executed from the beginning of the rendering link list each time, reducing the number of nodes to be executed and improving the rendering efficiency.

In the video special effect configuration file generation method provided by the embodiment of the present disclosure, a reference image is obtained; a screen splitting processing operation of a user on the reference image is received; screen splitting processing is performed on the reference image based on the screen splitting processing operation to obtain a plurality of sub-screens; and in response to a special effect setting operation of the user on a target sub-screen among the plurality of sub-screens, at least one first special effect corresponding to the special effect setting operation is associated with the target sub-screen, to generate the video special effect configuration file. In the present disclosure, the user can customize the screen splitting processing manner and the rendering special effect of the sub-screen, so that the video special effect configuration is flexible and is more convenient for use.

After the designer of the video special effect configuration file generates the video special effect configuration file using the video special effect configuration file generation tool, the video special effect configuration file can be used by an ordinary user who shoots the video and has a special effect rendering need.

Figure 3:
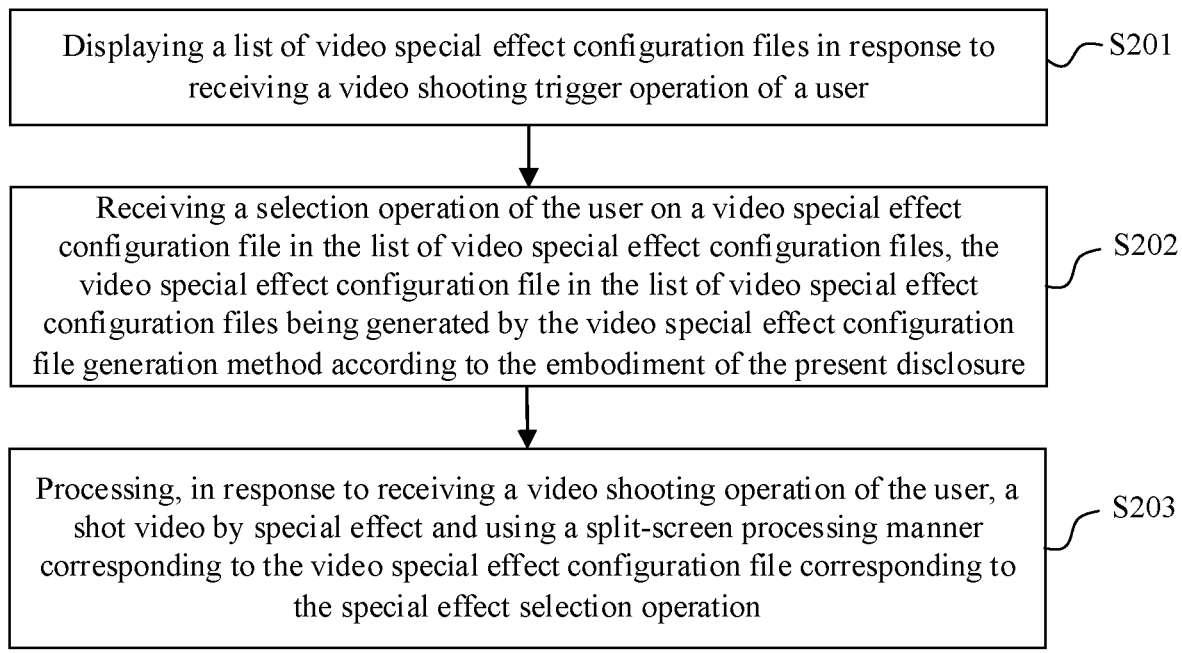
FIG. 3 is a flowchart of a video rendering method according to an embodiment of the present disclosure.

FIG. 3 is a flowchart of a video rendering method according to an embodiment of the present disclosure. As shown in FIG. 3, the method may include the following blocks.

At block S201, a list of video special effect configuration files is displayed in response to receiving a video shooting trigger operation of a user.

When the user uses an application to shoot a video and triggers a video shooting button, a list of video special effect configuration files is displayed to the user, and the user can select a video special effect configuration file from the list.

At block S202, a selection operation of the user on the video special effect configuration file of the list of video special effect configuration files is received. The video special effect configuration file of the list of video special effect configuration files is generated by the video special effect configuration file generation method according to the embodiment of the present disclosure.

At block S203, in response to receiving a video shooting operation of the user, a shot video is processed by using a special effect and a screen splitting processing manner corresponding to the video special effect configuration file corresponding to the special effect selection operation.

After the user selects the video special effect configuration file in the list, the video shot by the user is rendered in accordance with the video special effect configuration file selected by the user, including screen splitting of the video, and special effect rendering in accordance with the special effect setting parameter corresponding to each sub-screen.

During rendering of the video, the pre-generated rendering link list is executed. The rendering link list includes a universal rendering link list and a sub-screen rendering link list. The universal rendering link list includes special effect node of each second special effect and an execution order of each second special effect. For a sub-screen, the sub-screen rendering link list includes a special effect node of each first special effect corresponding to the sub-screen and an execution order of each first special effect. The first special effect node of the sub-screen rendering link list is connected to the last special effect node of the universal rendering link list.

During executing of the rendering link list, firstly, the special effect node of the at least one second special effect that is predetermined and universal to respective sub-screens is executed, and then the special effect node of the first special effect corresponding to each sub-screen is executed in sequence.

The difference between the rendering link list in the present disclosure and the rendering link list in the related art is that the rendering link list in the related art is a single-chain structure, and each single chain includes the special effect node of at least one second special effect that is predetermined and universal to respective sub-screens and the execution order of each second special effect, as well as the special effect node of the first special effect corresponding to each sub-screen and the execution order of each first special effect. That is to say, rendering of each sub-screen needs to execute the special effect node of the at least one predetermined second special effect that is universal to respective sub-screens.

Take the rendering link list in FIG. 2 as an example, rendering of each sub-screen starts from the beginning of the rendering link list. The beginning of the rendering link list is the "built-in dermabrasion" node. According to the present disclosure, the "built-in dermabrasion", "built-in filter" and "built-in beauty makeup" only need to be executed once.

After that, the rendering of each sub-screen is done by copying the node "screen splitting" in the rendering link list and rendering the next sub-screen from this node without starting from the beginning.

Therefore, by using the rendering link list of the present disclosure for video rendering, since the node can be copied from the rendering link list to change the rendering link list from the single-chain structure to a multi-branch structure, rendering of each sub-screen does not need to be executed from the beginning of the rendering link list each time, reducing the number of nodes to be executed and improving the rendering efficiency.

In the video rendering method according to the embodiment of the present disclosure, a list of video special effect configuration files is displayed in response to receiving a video shooting trigger operation of the user; a selection operation of the user on a video special effect configuration file in a list of video special effect configuration files is received, the video special effect configuration file in the list of special effect configuration files being generated by the video special effect configuration file generation method according to the embodiment of the present disclosure; in response to receiving a video shooting operation of the user, a shot video is processed by using a special effect and a screen splitting processing manner corresponding to the video special effect configuration file corresponding to the special effect selection operation. In the present disclosure, the shot video is rendered by using a special effect and the screen splitting processing manner corresponding to the video special effect configuration file, which avoids repeated execution of some nodes in the rendering link list, and improves the rendering efficiency.

Figure 4:
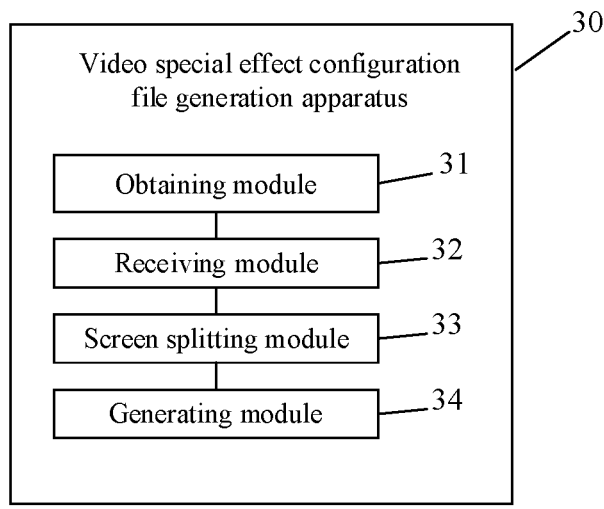
FIG. 4 is a schematic structural diagram of a video special effect configuration file generation apparatus according to an embodiment of the present disclosure.

Based on the same principle as the method shown in FIG. 1, an embodiment of the present disclosure further provides a video special effect configuration file generation apparatus 30, as shown in FIG. 4. The video special effect configuration file generation apparatus 30 may include an obtaining module 31, a receiving module 32, a screen splitting module 33, and a generating module 34.

The obtaining module 31 is configured to obtain a reference image.

The receiving module 32 is configured to receive a screen splitting processing operation of a user on the reference image.

The screen splitting module 33 is configured to perform screen splitting processing on the reference image based on the screen splitting processing operation to obtain a plurality of sub-screens.

The generating module 34 is configured to associate, in response to a special effect setting operation of the user on a target sub-screen among the plurality of sub-screens, at least one first special effect corresponding to the special effect setting operation with the target sub-screen, to generate a video special effect configuration file.

In a possible implementation, the screen splitting processing operation includes a screen splitting mode selection operation. The screen splitting module 33 is configured to perform the screen splitting processing on the reference image based on a screen splitting mode corresponding to the screen splitting mode selection operation on the reference image by the user, to obtain the plurality of sub-screens.

In a possible implementation, the screen splitting processing operation includes a sub-screen copy operation. The screen splitting module 33 is configured to copy the reference image based on the sub-screen copy operation on the reference image by the user to obtain the plurality of sub-screens, each of the plurality of sub-screens displaying the reference image.

In a possible implementation, the screen splitting processing operation includes a sub-screen splitting operation. The screen splitting module 33 is configured to split the reference image based on the sub-screen splitting operation on the reference image by the user to obtain the plurality of sub-screens, each of the plurality of sub-screens displaying a part of the reference image.

In a possible implementation, the special effect setting operation includes adding a special effect element to the target sub-screen.

In a possible implementation, the special effect setting operation is implemented by: receiving a size setting operation of the user on the target sub-screen; and determining a size of the target sub-screen based on a size parameter corresponding to the size setting operation.

In a possible implementation, the special effect setting operation is implemented by: receiving a position setting operation of the user on the target sub-screen, and determining, based on the position setting operation, a position parameter corresponding to the target sub-screen; and determining a display position of the target sub-screen based on the position parameter.

In a possible implementation, the video special effect configuration file further includes at least one second special effect that is predetermined and universal to respective sub-screens of the plurality of sub-screens.

In a possible implementation, the generating module 34 is further configured to: generate and store a rendering link list corresponding to the video special effect configuration file. The rendering link list includes a universal rendering link list and a sub-screen rendering link list. The universal rendering link list includes a special effect node of each of the at least one second special effect and an execution order of each of the at least one second special effect. The sub-screen rendering link list includes a special effect node of each of the at least one first special effect corresponding to the target sub-screen and an execution order of each of the at least one first special effect. A first special effect node of the sub-screen rendering link list is connected to a last special effect node of the universal rendering link list.

The video special effect configuration file generation apparatus in the embodiment of the present disclosure can perform the video special effect configuration file generation method in the embodiment of the present disclosure, and the implementation principle is similar. The actions performed by the modules in the video special effect configuration file generation apparatus in the respective embodiment of the present disclosure correspond to the blocks in the video special effect configuration file generation method in the respective embodiment of the present disclosure. For the detailed function description of each module in the video special effect configuration file generation apparatus, please refer to the corresponding descriptions of the video special effect configuration file generation method in the foregoing description, which will not be repeated here.

According to the video special effect configuration file generation apparatus provided by the embodiment of the present disclosure, a reference image is obtained; a screen splitting processing operation of a user on the reference image is received; screen splitting processing is performed on the reference image based on the screen splitting processing operation to obtain a plurality of sub-screens; and in response to a special effect setting operation of the user on a target sub-screen among the plurality of sub-screens, at least one first special effect corresponding to the special effect setting operation is associated with the target sub-screen to generate a video special effect configuration file. In the present disclosure, the user can customize the screen splitting processing manner and the rendering special effect of the sub-screen, so that the video special effect configuration is flexible and is more convenient for use.

Figure 5:
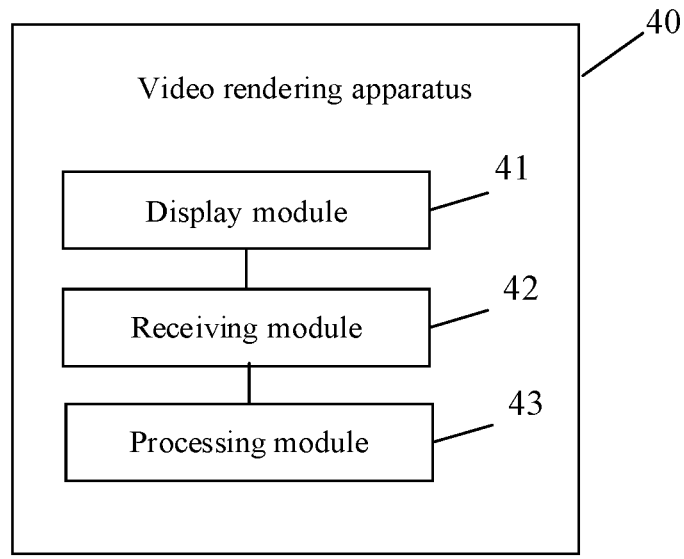
FIG. 5 is a schematic structural diagram of a video rendering apparatus according to an embodiment of the present disclosure.

Based on the same principle as the method shown in FIG. 3, an embodiment of the present disclosure further provides a video rendering apparatus 40. As shown in FIG. 5, the video rendering apparatus 40 may include a display module 41, a receiving module 42, and a processing module 43.

The display module 41 is configured to display a list of video special effect configuration files in response to receiving a video shooting trigger operation of a user.

The receiving module 42 is configured to receive a selection operation of the user on a video special effect configuration file in the list of video special effect configuration files. The video special effect configuration file in the list of video special effect configuration file is generated by the video special effect configuration file generation method in the embodiment of the present disclosure.

The processing module 43 is configured to process, in response to receiving a video shooting operation of the user, a shot video by using a special effect and a screen splitting processing manner corresponding to the video special effect configuration file corresponding to the special effect selection operation.

The video rendering apparatus in the embodiment of the present disclosure can perform the video rendering method in the embodiment of the present disclosure, and the implementation principle is similar. The actions performed by the modules in the video rendering apparatus in the respective embodiment of the present disclosure correspond to the blocks in the video rendering method in the respective embodiment of the present disclosure. For the detailed function description of each module in the video rendering apparatus, please refer to the corresponding descriptions of the video rendering method in the foregoing description, which will not be repeated here.

According to the video rendering apparatus according to the embodiment of the present disclosure, a list of video special effect configuration files is displayed in response to receiving a video shooting trigger operation of the user; a selection operation of the user on a video special effect configuration file in the list of video special effect configuration files is received, the video special effect configuration file in the list of special effect configuration files being generated by the video special effect configuration file generation method according to the embodiment of the present disclosure; and in response to receiving a video shooting operation of the user, a shot video is processed by using a special effect and a screen splitting processing manner corresponding to the video special effect configuration file corresponding to the special effect selection operation. In the present disclosure, the shot video is rendered by using a special effect and the screen splitting processing manner corresponding to the video special effect configuration file, which avoids repeated execution of some nodes in the rendering link list, and improves the rendering efficiency.

Figure 6:
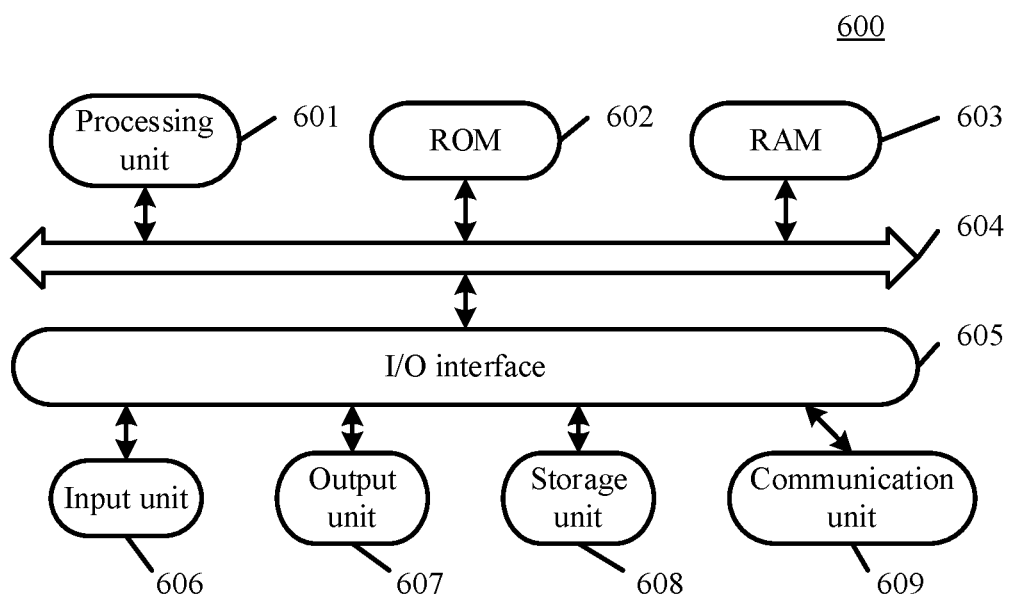
FIG. 6 is a schematic structural diagram of an electronic device according to an embodiment of the present disclosure.

FIG. 6 is a schematic structural diagram of an electronic device 600 adapted to implement the embodiments of the present disclosure. An execution subject of the technical solution of the embodiment of the present disclosure may include, but is not limited to, a mobile terminal such as a mobile phone, a laptop computer, a digital broadcast receiver, a Personal Digital Assistant (PDA), a tablet computer or PAD, a Portable Multimedia Player (PMP), or an in-vehicle terminal (e.g., an in-vehicle navigation terminal), or a fixed terminal such as a digital TV, a desktop computer, etc. The electronic device illustrated in FIG. 6 is exemplary only, and should not be construed as limiting the function and scope of use of the embodiments of the present disclosure.

The electronic device includes a memory and a processor. Here the processor may be referred to as a processing device 601 below. The memory may include at least one of a Read-Only Memory (ROM) 602, a Random Access Memory (RAM) 603, and a storage device 608 as described below.

In particular, as illustrated in FIG. 6, the electronic device 600 may include a processing unit (such as a central processing unit, a graphics processing unit, etc.) 601, which may perform various appropriate actions and processes in accordance with programs stored in a Read Only Memory (ROM) 602 or loaded from a storage unit 608 into a Random Access Memory (RAM) 603. Various programs and data required for operation of the electronic device 600 may also be stored in the RAM 603. The processing unit 601, the ROM 602, and the RAM 603 are connected to each other via a bus 604. An Input/Output (I/O) interface 605 is also connected to the bus 604.

Generally, the following devices may be connected to the I/O interface 605: an input unit 606 including, for example, a touch screen, a touch pad, a keyboard, a mouse, a camera, a microphone, an accelerometer, a gyroscope, etc.; an output unit 607 including, for example, a Liquid Crystal Display (LCD), a speaker, an oscillator, etc.; a storage unit 608 including, for example, a magnetic tape or a hard disk; and a communication unit 609. The communication unit 609 may allow the electronic device 600 to perform wireless or wired communication with other devices for data exchange. Although FIG. 6 illustrates the electronic device 600 having various units, it can be appreciated that it is not necessary to implement or provide all the illustrated units. Alternatively, more or fewer units may be implemented or provided.

In particular, according to an embodiment of the present disclosure, the processes described above with reference to the flowcharts may be implemented as computer software programs. For example, an embodiment of the present disclosure includes a computer program product, which includes a computer program carried on a non-transitory computer-readable storage medium. The computer program includes program codes for implementing the method illustrated in any of the flowcharts. In such an embodiment, the computer program may be downloaded and installed from a network through the communication unit 609, or installed from the storage unit 608, or installed from the ROM 602. When the computer program is executed by the processing unit 601, the above-mentioned functions defined in the methods according to the embodiments of the present disclosure are performed.

It is to be noted that the above computer-readable medium in the present disclosure may be a computer-readable signal medium or a computer-readable storage medium or any combination thereof. The computer-readable storage medium may be, but is not limited to, for example, an electrical, magnetic, optical, electromagnetic, infrared, or semiconductor system, apparatus, or device, or any combination thereof. More specific examples of the computer-readable medium may include, but are not limited to: an electrical connection having one or more wires, a portable computer disk, a hard disk, a Random Access Memory (RAM), a Read Only Memory (ROM), an Erasable Programmable Read Only Memory (EPROM) or a flash memory, an optical fiber, a Compact Disc Read-Only Memory (CD-ROM), an optical memory device, a magnetic memory device, or any suitable combination thereof. In the present disclosure, the computer-readable medium may be any tangible medium including or storing programs, which may be used by or used with an instruction execution system, apparatus, or device. However, in the present disclosure, the computer-readable signal medium may include a data signal propagated in a baseband or as a part of a carrier that carries computer-readable program codes. Such propagated data signal may be in various forms, including but not limited to an electromagnetic signal, an optical signal, or any suitable combination thereof. The computer-readable signal medium may be any computer-readable storage medium other than the computer-readable storage medium, which may transmit, propagate, or transfer programs used by or used with an instruction execution system, apparatus or device. The program codes contained on the computer-readable medium may be transmitted via any appropriate medium, including but not limited to electric cable, optical cable, Radio Frequency (RF), or any suitable combination thereof.

In some embodiments, a client and a server can use any currently known or future developed network protocol, such as HyperText Transfer Protocol (HTTP), for communication, and can interconnect with digital data communication in any form or medium (e.g., communication networks). Examples of communication networks include Local Area Network (LAN), Wide Area Network (WAN), Inter-network (e.g., Internet), and peer-to-peer network (e.g., ad hoc peer-to-peer networks), as well as any currently known or future developed network.

The above computer-readable medium may be included in the above electronic device; or may be standalone without being assembled into the electronic device.

The above computer-readable medium carries one or more programs which, when executed by the electronic device, cause the electronic device to: obtain a reference image; receive a screen splitting processing operation of a user on the reference image; perform screen splitting processing on the reference image based on the screen splitting processing operation to obtain a plurality of sub-screens; and associate, in response to a special effect setting operation of the user on a target sub-screen among the plurality of sub-screens, at least one first special effect corresponding to the special effect setting operation with the target sub-screen, to generate a video special effect configuration file.

Alternatively, the above computer-readable medium may carry one or more programs which, when executed by the electronic device, cause the electronic device to: display a list of video special effect configuration files in response to receiving a video shooting trigger operation of a user; receive a selection operation of the user on a video special effect configuration file in the list of video special effect configuration files, the video special effect configuration file in the list of video special effect configuration file being generated by the video special effect configuration file generation method according to the embodiment of the present disclosure; and process, in response to receiving a video shooting operation of the user, a shot video by using a special effect and a screen splitting processing manner corresponding to the video special effect configuration file corresponding to the special effect selection operation.

The computer program codes for implementing the operations according to the embodiments of the present disclosure may be written in one or more programming languages or any combination thereof. The programming languages may include, but are not limited to, object-oriented programming languages, such as Java, Smalltalk, or C++, as well as conventional procedure-oriented programming languages, such as "C" language or similar programming languages. The program codes may be executed completely on a user computer, partly on the user computer, as a standalone software package, partly on the user computer and partly on a remote computer, or completely on the remote computer or server. In a case where the remote computer is involved, the remote computer may be connected to the user computer through any type of network, including a Local Area Network (LAN) or a Wide Area Network (WAN), or to an external computer (e.g., over the Internet by using an Internet service provider).

The flowcharts and block diagrams in the figures illustrate the architectures, functions, and operations of possible implementations of the systems, methods and computer program products according to various embodiments of the present disclosure. In this regard, each block in the flowchart or block diagram may represent a module, a program segment, or a portion of codes that contains one or more executable instructions for implementing the specified logical functions. It should also be noted that, in some alternative implementations, the functions shown in the blocks may occur in other orders than those shown in the figures. For example, two blocks shown in succession may, in fact, be executed substantially concurrently, or the blocks may sometimes be executed in the reverse order, depending on the functions involved. It is also to be noted that each block in the block diagrams and/or flowcharts, and combinations of blocks in the block diagrams and/or flowcharts, can be implemented in dedicated hardware-based systems that perform the specified functions or operations, or can be implemented in a combination of dedicated hardware and computer instructions.

The modules or units involved in the embodiments of the present disclosure may be implemented in software or hardware. Here, the names of the modules or units do not constitute any limitation of the units themselves under certain circumstances.

The functions described above may be performed, at least in part, by one or more hardware logic components. For example, as non-limiting examples, exemplary types of hardware logic components that may be used include: Field Programmable Gate Arrays (FPGAs), Application Specific Integrated Circuits (ASICs), Application Specific Standard Products (ASSPs), Systems on Chips (SOCs), Complex Programmable Logical Devices (CPLDs) and the like.

In the context of the present disclosure, a machine-readable medium may be a tangible medium that may contain or store a program for use by or in connection with an instruction execution system, apparatus or device. The machine-readable medium may be a machine-readable signal medium or a machine-readable storage medium. The machine-readable medium may include, but not limited to, electronic, magnetic, optical, electromagnetic, infrared, or semiconductor system, apparatus, or device, or any suitable combination thereof. More specific examples of machine-readable storage medium may include one or more wire-based electrical connection, portable computer disk, hard disk, Random Access Memory (RAM), Read Only Memory (ROM), Erasable Programmable Read Only Memory (EPROM or flash memory), optical fiber, Compact Disk Read Only Memory (CD-ROM), optical storage device, magnetic storage device, or any suitable combination thereof.

According to one or more embodiments of the present disclosure, the present disclosure provides a video special effect configuration file generation method. The method includes: obtaining a reference image; receiving a screen splitting processing operation of a user on the reference image; performing screen splitting processing on the reference image based on the screen splitting processing operation to obtain a plurality of sub-screens; and associating, in response to a special effect setting operation of the user on a target sub-screen among the plurality of sub-screens, at least one first special effect corresponding to the special effect setting operation with the target sub-screen, to generate a video special effect configuration file.

In a possible implementation, the screen splitting processing operation includes a screen splitting mode selection operation. The operation of performing the screen splitting processing on the reference image based on the screen splitting processing operation to obtain the plurality of sub-screens includes: performing the screen splitting processing on the reference image based on a screen splitting mode corresponding to the screen splitting mode selection operation on the reference image by the user, to obtain the plurality of sub-screens.

In a possible implementation, the screen splitting processing operation includes a sub-screen copy operation. The operation of performing the screen splitting processing on the reference image based on the screen splitting processing operation to obtain the plurality of sub-screens includes: coping the reference image based on the sub-screen copy operation on the reference image by the user to obtain the plurality of sub-screens, each sub-screen of the plurality of sub-screens displaying the reference image.

In a possible implementation, the screen splitting processing operation includes a sub-screen splitting operation. The operation of performing the screen splitting processing on the reference image based on the screen splitting processing operation to obtain the plurality of sub-screens includes: splitting the reference image based on the sub-screen splitting operation on the reference image by the user to obtain the plurality of sub-screens, each sub-screen of the plurality of sub-screens displaying a part of the reference image.

In a possible implementation, the special effect setting operation includes adding a special effect element to the target sub-screen.

In a possible implementation, the special effect setting operation is implemented by: receiving a size setting operation of the user on the target sub-screen; and determining a size of the target sub-screen based on a size parameter corresponding to the size setting operation.

In a possible implementation, the special effect setting operation is implemented by: receiving a position setting operation of the user on the target sub-screen, and determining, based on the position setting operation, a position parameter corresponding to the target sub-screen; and determining a display position of the target sub-screen based on the position parameter.

In a possible implementation, the video special effect configuration file further includes at least one second special effect that is predetermined and universal to respective sub-screens of the plurality of sub-screens.

In a possible implementation, the method further includes: generating and storing a rendering link list corresponding to the video special effect configuration file.

The rendering link list includes a universal rendering link list and a sub-screen rendering link list. The universal rendering link list includes a special effect node of each of the at least one second special effect and an execution order of each of the at least one second special effect. The sub-screen rendering link list includes a special effect node of each of the at least one first special effect corresponding to the target sub-screen and an execution order of each of the at least one first special effect. A first special effect node of the sub-screen rendering link list is connected to a last special effect node of the universal rendering link list.

According to one or more embodiments of the present disclosure, the present disclosure provides a video rendering method. The method includes: displaying a list of video special effect configuration files in response to receiving a video shooting trigger operation of a user; receiving a selection operation of the user on a video special effect configuration file in the list of video special effect configuration files, the video special effect configuration file in the list of video special effect configuration files being generated by the video special effect configuration file generation method according to the embodiment of the present disclosure; and processing, in response to receiving a video shooting operation of the user, a shot video by using a special effect and a screen splitting processing manner corresponding to the video special effect configuration file corresponding to the special effect selection operation.

According to one or more embodiments of the present disclosure, the present disclosure provides a video special effect configuration file generation apparatus. The apparatus includes: an obtaining module configured to obtain a reference image; a receiving module configured to receive a screen splitting processing operation of a user on the reference image; a screen splitting module configured to perform screen splitting processing on the reference image based on the screen splitting processing operation to obtain a plurality of sub-screens; and a generating module configured to associate, in response to a special effect setting operation of the user on a target sub-screen among the plurality of sub-screens, at least one first special effect corresponding to the special effect setting operation with the target sub-screen, to generate a video special effect configuration file.

In a possible implementation, the screen splitting processing operation includes a screen splitting mode selection operation. The screen splitting module is configured to perform the screen splitting processing on the reference image based on a screen splitting mode corresponding to the screen splitting mode selection operation on the reference image by the user, to obtain the plurality of sub-screens.

In a possible implementation, the screen splitting processing operation includes a sub-screen copy operation. The screen splitting module is configured to copy the reference image based on the sub-screen copy operation on the reference image by the user to obtain the plurality of sub-screens, each sub-screen of the plurality of sub-screens displaying the reference image.

In a possible implementation, the screen splitting processing operation includes a sub-screen splitting operation. The screen splitting module is configured to split the reference image based on the sub-screen splitting operation on the reference image by the user to obtain the plurality of sub-screens, each sub-screen of the plurality of sub-screens displaying a part of the reference image.

In a possible implementation, the special effect setting operation includes adding a special effect element to the target sub-screen.

In a possible implementation, the special effect setting operation is implemented by: receiving a size setting operation of the user on the target sub-screen; and determining a size of the target sub-screen based on a size parameter corresponding to the size setting operation.

In a possible implementation, the special effect setting operation is implemented by: receiving a position setting operation of the user on the target sub-screen, and determining, based on the position setting operation, a position parameter corresponding to the target sub-screen; and determining a display position of the target sub-screen based on the position parameter.

In a possible implementation, the video special effect configuration file further includes at least one second special effect that is predetermined and universal to respective sub-screens of the plurality of sub-screens.

In a possible implementation, the generating module is further configured to: generate and store a rendering link list corresponding to the video special effect configuration file.

The rendering link list includes a universal rendering link list and a sub-screen rendering link list. The universal rendering link list includes a special effect node of each of the at least one second special effect and an execution order of each of the at least one second special effect. The sub-screen rendering link list includes a special effect node of each of the at least one first special effect corresponding to the target sub-screen and an execution order of each of the at least one first special effect. A first special effect node of the sub-screen rendering link list is connected to a last special effect node of the universal rendering link list.

According to one or more embodiments of the present disclosure, the present disclosure provides a video rendering apparatus. The apparatus includes: a display module configured to display a list of video special effect configuration files in response to receiving a video shooting trigger operation of a user; a receiving module configured to receive a selection operation of the user on a video special effect configuration file in the list of video special effect configuration files, the video special effect configuration file in the list of video special effect configuration files being generated by the video special effect configuration file generation method according to the embodiment of the present disclosure; and a processing module configured to process, in response to receiving a video shooting operation of the user, a shot video by using a special effect and a screen splitting processing manner corresponding to the video special effect configuration file corresponding to the special effect selection operation.

According to one or more embodiments of the present disclosure, the present disclosure provides an electronic device. The electronic device includes: one or more processors; a memory; and one or more application programs stored in the memory and configured to be executed by the one or more processors. The one or more programs are configured to implement the video special effect configuration file generation method or the video rendering method.

According to one or more embodiments of the present disclosure, the present disclosure provides a computer-readable medium having computer instructions stored thereon. The computer instructions, when running on a computer, cause the computer to implement the video special effect configuration file generation method or the video rendering method.

The above description is merely an illustration of some preferred embodiments of the present disclosure and the technical principles as used. Those skilled in the art should understand that the scope of disclosure involved in the present disclosure is not limited to the technical solutions formed by the specific combinations of the above technical features, and should also cover other technical solutions formed by any combination of the above technical features and their equivalent features without departing from the above disclosed concept, e.g., technical solutions formed by replacing the above features with the technical features disclosed in (but not limited to) the present disclosure and having similar functions.

Additionally, although operations are depicted in a particular order, this should not be construed as the operations being necessarily performed in the particular order as shown or in a sequential order. Under certain circumstances, multi-task and parallel processing may be advantageous. Likewise, although the above discussion contains several specific implementation details, these should not be construed as limitations on the scope of the present disclosure. Certain features that are described in the context of separate embodiments can also be implemented in combination in a single embodiment. Alternatively, various features that are described in the context of a single embodiment can also be implemented in multiple embodiments separately or in any suitable sub-combination.

Although the subject matter has been described in language specific to structural features and/or logical actions of method, it is to be understood that the subject matter defined in the appended claims is not necessarily limited to the specific features or actions described above. Rather, the specific features and actions described above are merely exemplary forms of implementing the claims.

What is claimed is:

1. A video special effect configuration file generation method, comprising:
   obtaining a reference image;
   receiving a screen splitting processing operation of a user on the reference image;
   performing screen splitting processing on the reference image based on the screen splitting processing operation to obtain a plurality of sub-screens; and
   associating, in response to a special effect setting operation of the user on a target sub-screen among the plurality of sub-screens, at least one first special effect corresponding to the special effect setting operation with the target sub-screen, to generate a video special effect configuration file,
   wherein the video special effect configuration file further comprises at least one second special effect that is predetermined and universal to each of the plurality of sub-screens.

2. The video special effect configuration file generation method according to claim 1, wherein the screen splitting processing operation comprises a screen splitting mode selection operation, and
   wherein said performing the screen splitting processing on the reference image based on the screen splitting processing operation to obtain the plurality of sub-screens comprises:
   performing the screen splitting processing on the reference image based on a screen splitting mode corresponding to the screen splitting mode selection operation on the reference image by the user, to obtain the plurality of sub-screens.

3. The video special effect configuration file generation method according to claim 1, wherein the screen splitting processing operation comprises a sub-screen copy operation, and
   wherein said performing the screen splitting processing on the reference image based on the screen splitting processing operation to obtain the plurality of sub-screens comprises:
   copying the reference image based on the sub-screen copy operation on the reference image by the user to obtain the plurality of sub-screens, each of the plurality of sub-screens displaying the reference image.

4. The video special effect configuration file generation method according to claim 1, wherein the screen splitting processing operation comprises a sub-screen splitting operation, and
wherein said performing the screen splitting processing on the reference image based on the screen splitting processing operation to obtain the plurality of sub-screens comprises:
splitting the reference image based on the sub-screen splitting operation on the reference image by the user to obtain the plurality of sub-screens, each of the plurality of sub-screens displaying a part of the reference image.

5. The video special effect configuration file generation method according to claim 1, wherein the special effect setting operation comprises adding a special effect element to the target sub-screen.

6. The video special effect configuration file generation method according to claim 1, wherein the special effect setting operation is implemented by:
receiving a size setting operation of the user on the target sub-screen; and
determining a size of the target sub-screen based on a size parameter corresponding to the size setting operation.

7. The video special effect configuration file generation method according to claim 1, wherein the special effect setting operation is implemented by:
receiving a position setting operation of the user on the target sub-screen, and determining a position parameter corresponding to the target sub-screen based on the position setting operation; and
determining a display position of the target sub-screen based on the position parameter.

8. The video special effect configuration file generation method according to claim 1, further comprising:
generating and storing a rendering link list corresponding to the video special effect configuration file,
wherein the rendering link list comprises a universal rendering link list and a sub-screen rendering link list, the universal rendering link list comprising a special effect node of each of the at least one second special effect and an execution order of each of the at least one second special effect, the sub-screen rendering link list comprising a special effect node of each of the at least one first special effect corresponding to the target sub-screen and an execution order of each of the at least one first special effect, wherein a first special effect node of the sub-screen rendering link list is connected to a last special effect node of the universal rendering link list.

9. A video rendering method, comprising:
displaying a list of video special effect configuration files in response to receiving a video shooting trigger operation of a user;
receiving a selection operation of the user on a video special effect configuration file in the list of video special effect configuration files, wherein the video special effect configuration file in the list of video special effect configuration files is generated by the video special effect configuration file generation method according to claim 1; and
processing, in response to receiving a video shooting operation of the user, a shot video by using a special effect and a screen splitting processing manner corresponding to the video special effect configuration file corresponding to the special effect selection operation,
wherein the video special effect configuration file further comprises at least one second special effect that is predetermined and universal to each of a plurality of sub-screens.

10. The video rendering method according to claim 9, wherein the screen splitting processing operation comprises a screen splitting mode selection operation, and
wherein said performing the screen splitting processing on the reference image based on the screen splitting processing operation to obtain the plurality of sub-screens comprises:
performing the screen splitting processing on the reference image based on a screen splitting mode corresponding to the screen splitting mode selection operation on the reference image by the user, to obtain the plurality of sub-screens.

11. The video rendering method according to claim 9, wherein the screen splitting processing operation comprises a sub-screen copy operation, and
wherein said performing the screen splitting processing on the reference image based on the screen splitting processing operation to obtain the plurality of sub-screens comprises:
copying the reference image based on the sub-screen copy operation on the reference image by the user to obtain the plurality of sub-screens, each of the plurality of sub-screens displaying the reference image.

12. The video rendering method according to claim 9, wherein the screen splitting processing operation comprises a sub-screen splitting operation, and
wherein said performing the screen splitting processing on the reference image based on the screen splitting processing operation to obtain the plurality of sub-screens comprises:
splitting the reference image based on the sub-screen splitting operation on the reference image by the user to obtain the plurality of sub-screens, each of the plurality of sub-screens displaying a part of the reference image.

13. The video rendering method according to claim 9, wherein the special effect setting operation comprises adding a special effect element to the target sub-screen.

14. The video rendering method according to claim 9, wherein the video special effect configuration file generation method further comprises:
generating and storing a rendering link list corresponding to the video special effect configuration file,
wherein the rendering link list comprises a universal rendering link list and a sub-screen rendering link list, the universal rendering link list comprising a special effect node of each of the at least one second special effect and an execution order of each of the at least one second special effect, the sub-screen rendering link list comprising a special effect node of each of the at least one first special effect corresponding to the target sub-screen and an execution order of each of the at least one first special effect, wherein a first special effect node of the sub-screen rendering link list is connected to a last special effect node of the universal rendering link list.

15. An electronic device, comprising:
one or more processors;
a memory; and
one or more application programs stored in the memory and configured to be executed by the one or more processors, the one or more application programs being configured to implement the video rendering method according to claim 9.

16. A non-transitory computer-readable medium, having computer instructions stored thereon, wherein the computer instructions, when running on a computer, cause the computer to implement the video rendering method according to claim 9.

17. An electronic device, comprising:

one or more processors; a memory; and one or more application programs stored in the memory and configured to be executed by the one or more processors, the one or more application programs being configured to implement operations comprising:

obtaining a reference image;

receiving a screen splitting processing operation of a user on the reference image;

performing screen splitting processing on the reference image based on the screen splitting processing operation to obtain a plurality of sub-screens;

generating a video special effect configuration file by associating, in response to a special effect setting operation of the user on a target sub-screen among the plurality of sub-screens, at least one first special effect corresponding to the special effect setting operation with the target sub-screen; and wherein the video special effect configuration file further comprises at least one second special effect that is predetermined and universal to each of the plurality of sub-screens.

18. A non-transitory computer-readable medium, having computer instructions stored thereon, wherein the computer instructions, when running on a computer, cause the computer to implement operations comprising:

obtaining a reference image;

receiving a screen splitting processing operation of a user on the reference image;

performing screen splitting processing on the reference image based on the screen splitting processing operation to obtain a plurality of sub-screens;

generating a video special effect configuration file by associating, in response to a special effect setting operation of the user on a target sub-screen among the plurality of sub-screens, at least one first special effect corresponding to the special effect setting operation with the target sub-screen; and wherein the video special effect configuration file further comprises at least one second special effect that is predetermined and universal to each of the plurality of sub-screens.

* * * * *